Sept. 15, 1931. J. F. MARTIN 1,822,975
FOLDABLE LUGGAGE CARRIER
Filed May 1, 1929
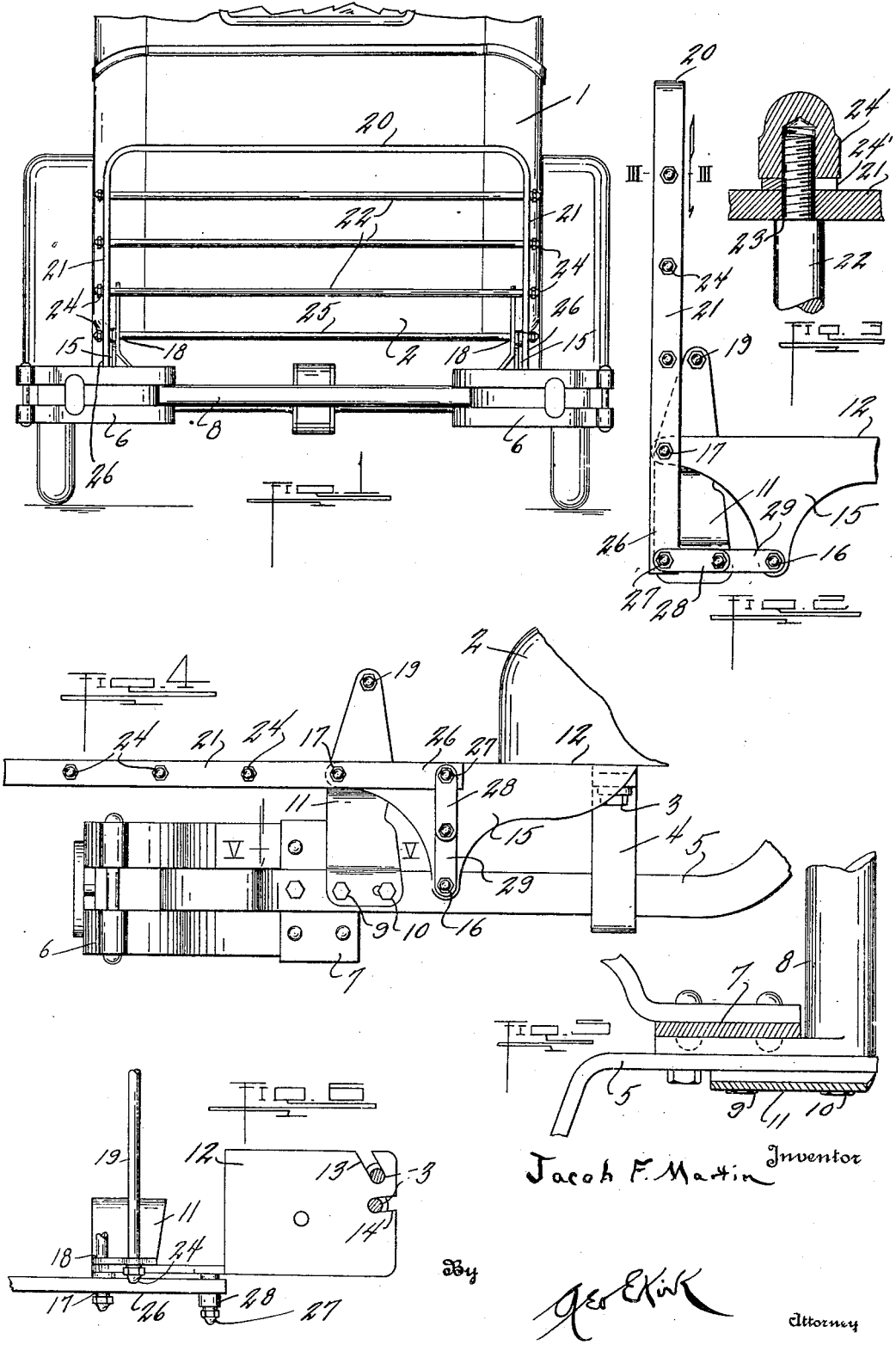
Jacob F. Martin Inventor
By Geo E Kirk Attorney Patented Sept. 15, 1931

1,822,975

UNITED STATES PATENT OFFICE

JACOB F. MARTIN, OF BELLEVUE, OHIO

FOLDABLE LUGGAGE CARRIER

Application filed May 1, 1929. Serial No. 359,452.

This invention relates to luggage carriers of the foldable type.

This invention has utility when incorporated in hinge-mounted linkage-controlled platform-providing luggage carriers.

Referring to the drawings:

Fig. 1 is a fragmentary view of a motor vehicle having an embodiment of a luggage carrier of this invention incorporated therewith and in decorative or out-of-use position;

Fig. 2 is an end view of the luggage carrier of Fig. 1;

Fig. 3 is a fragmentary section on the line III—III, Fig. 2;

Fig. 4 is a fragmentary end view of the luggage carrier of Fig. 1, in in-use position;

Fig. 5 is a section on the line V—V, Fig. 4; and

Fig. 6 is a fragmentary plan view of the mounting bracket assembly for the luggage carrier.

Motor vehicle 1 is shown as having body 2 with bolts 3 having depending hangers 4 for bumper mounting members 5 from the body 2 extending past the hangers 4 to carry bumperettes 6 assembled by plates 7 with transverse stiffening bar 8. Bolts 9 and 10 in this assembly, as herein disclosed, are used to mount upstanding auxiliary bracket 11. Additionally, plate 12 is shown as having notches 13, 14, which upon slacking off of the bolts 3, permit anchoring of this plate 12 with the body 2 of the motor vehicle. This plate 12 has depending portion 15 which provides lower pivot bearing 16 and rearward pivot bearing 17 registering with pivot bearing 18 in the bracket 11. This bracket 11 extends upwardly from the pivot bearing 17, 18, to bar 19 as a minor stiffening bar upwardly from the bar 8.

The deck or platfrom proper of this luggage carrier comprises a frame member having cross-over portion 20 and integral parallel legs 21 therefrom in completing the U-form for this main frame of the platform. Between these parallel legs 21 and parallel with the cross-over portion 20, bars 22 are assembled through openings 23 in the legs 21 abutting split spring lock washers 24' and effectively anchored therewith by decorative trim nuts 24.

Bar 25 as the one remote from the cross-over 20 is herein assembled through the pivot bearings 17, 18, in completing this hinge mounting for the frame or platform proper. The legs 21 of the U-frame 20, 21, extend beyond the bar 25 in free end extensions 26, having pivot bearings 27 therein from which extend linkage 28, 29, as a toggle to the bearings 16.

In the in-use or horizontal position for the deck or platform 20, 21, 22, 25, the bar 19 may serve as a spacer against the luggage striking the rear of the vehicle, while the extensions 26 of the deck U-frame legs past the bearings 17, are connected by the toggle linkage 28, 29, said linkage being extended in approximately vertical position, locking the platform against upward shifting into out-of-use position (Fig. 4).

In the event it is desired to shift the platform to vertical or out-of-use position, it is only necessary to break the toggles 28, 29, by shifting their connection away from the dead point, and then swinging the free or cross bar portion 20 of the platform on the hinge pin bar 25 as a hinge mounting, upward. This will shift the toggle into horizontal automatic locking position and thereby retain this deck in the decorative vertical out-of-use position (Figs. 1, 2).

It is accordingly seen there is simple mounting assembly for this structure directly with the vehicle body independently of direct connection to the bumper portions proper. Furthermore, that the deck itself may be readily adjusted from in-use to out-of-use position and automatically lock itself in such position.

What is claimed and it is desired to secure by United States Letters Patent is:

1. A luggage carrier comprising a platform having end portions, said end portions being pivotally connected to a supporting structure and said end portions having extensions beyond the pivotal connection, and a toggle linkage connecting the ends of said extensions to said supporting structure.

2. A luggage carrier comprising a platform having end portions, said end portions being pivotally connected to a supporting structure and said end portions having extensions beyond the pivotal connection, and a toggle linkage connecting the ends of said extensions to said supporting structure in such a manner as to be in a position of dead center when the luggage carrier platform is in either a vertical or horizontal position.

3. A luggage carrier comprising a platform having end portions, said end portions being pivotally connected to bracket plates having horizontally extending mounting portions and drop portions and said end portions having extensions beyond the pivotal connection, and a toggle linkage connecting the ends of said extensions to said bracket plate drop portions.

4. A luggage carrier comprising a platform having end portions, bracket means providing pivotal mounting means for the carrier end portions, supporting means from which said bracket means extend horizontally and which bracket means have vertical portions, said end portions having extensions beyond the pivotal mounting means, and a toggle linkage connecting the ends of said extensions to said vertical portions.

In witness whereof I affix my signature.

JACOB F. MARTIN.